United States Patent [19]

Schneider et al.

[11] 4,160,747

[45] Jul. 10, 1979

[54] ELECTRODE AND MANUFACTURING METHOD THEREFOR

[75] Inventors: Gerhard Schneider; Werner Riedl; Hans-Martin Lippold, all of Ellwangen, Fed. Rep. of Germany

[73] Assignee: Varta Batterie Aktiengesellschaft, Hanover, Fed. Rep. of Germany

[21] Appl. No.: 872,917

[22] Filed: Jan. 27, 1978

Related U.S. Application Data

[63] Continuation of Ser. No. 410,282, Oct. 26, 1973, abandoned.

[51] Int. Cl.$^2$ .............................................. H01B 1/08
[52] U.S. Cl. .................................. 252/506; 252/511; 429/217
[58] Field of Search ................. 252/506, 511, 182.1; 429/217; 264/104, 105

[56] References Cited

U.S. PATENT DOCUMENTS

| | | | |
|---|---|---|---|
| 3,306,781 | 2/1967 | Siller | 429/217 |
| 3,442,715 | 5/1969 | Yee et al. | 252/426 |

FOREIGN PATENT DOCUMENTS 52-8379  5/1977  Japan ........................ 429/217

*Primary Examiner*—Benjamin R. Padgett
*Assistant Examiner*—E. Suzanne Parr
*Attorney, Agent, or Firm*—Weiser, Stapler & Spivak

[57] ABSTRACT

An electrode for a primary cell is produced by first mixing a solid depolarizer, carbon, and a water-insoluble organic polymer binder. The mixture is then molded into an electrode body. The binder is in the mixture in the form of a dispersion in a hydrophilic medium.

8 Claims, No Drawings

ELECTRODE AND MANUFACTURING METHOD THEREFOR

This is a continuation of application Ser. No. 410,282, filed Oct. 26, 1973, now abandoned.

The invention relates to a method for the manufacture of a positive electrode containing a binder for primary cells with alkaline electrolytes.

In the manufacture of alkaline primary cells, it is necessary to produce moldings of various prismatic or annular shapes for use as the positive electrodes. These moldings which are normally produced on commercially available machines from a mixture of manganese dioxide and graphite, have to meet not only electromechanical requirements, but also minimum requirements of accuracy as to size and mechanical strength in order to assure troublefree handling during mass production. It is known to include a binder in the molding compound for this purpose.

In the method described in German Patentschrift 1,139,167, Portland cement provides an inorganic binder which is added to an electrode mass of manganese dioxide and graphite, in which the Portland cement bonds with the electrolyte mixed with the molding compound to impart adequate mechanical strength to the molding. This method has, however, the disadvantage that the mixed moist electrode mass has only limited stability in storage, and has to be processed within a short, defined period of time in order to prevent it from setting prematurely before the molding operation.

An additional disadvantage stems from the discharge of electrolyte when the cathode body is molded, whereby the molding tools or molds are rapidly contaminated.

In a further method, described in German Patentschrift 1,228,685, organic polymers, such as polyisobutylene, are used. In this method, the polymer is dissolved in an organic solvent and is mixed with the electrode mass. When the solvent has evaporated, the surfaces of the individual particles of manganese dioxide and graphite in the mass are coated with a thin film of the organic polymer, the polymer acting as an adhesive upon subsequent molding of the electrodes. The disadvantages of this method are reduced electrical conductivity, and the necessity of having to provide elaborate apparatus for removing the solvent vapors in order to minimize pollution of the environment and avoid poisoning and dermatitis. The considerable cost of the solvent also has to be taken into account.

To avoid or mitigate the aforementioned difficulties, it is known to mix with the molding compound an organic polymer in powder form, such as polystyrene or polyethylene. The moldings thus obtained also have satisfactory mechanical strength, but it is difficult to obtain homogeneous dispersion of the binder in the preparation of the molding compound. The substantial variation in the particle sizes and densities of manganese dioxide, graphite and binder result in separation of the molding compound components during its preparation and during its metering into the mold, causing locally varying concentrations of binder and varying compression densities of the electrode body, plus non-homogeneous composition, varying particle weights and substantially varying physical properties.

However, the aforementioned electromechanical properties of the moldings are at least equally important, since their hydrophobic properties are considerably affected by variations in the processing technique and in the qualities of binders added to the molding composition.

When a solution of organic binder is added, the particles in the mass are coated with a film of the binder which, apart from having the insulating effect hereinbefore referred to, may impart to the cathode hydrophobic properties which are too pronounced to permit electrochemical reaction, so that the electrolyte is prevented from entering into the cathode or can only do so to an inadequate extent.

When a dry, powder binder is used, irregular concentrations of binder occur instead of the individual particles in the mass being coated with a film, so that regions of varying hydrophobic and/or hydrophilic properties occur in the electrode; this results in the known disadvantages of non-uniform diffusion of the electrolyte in the electrochemical reaction.

Thus, the requirements of optimum distribution of the binder in the molding for ready introduction of the molding compound, unlimited times of processability of the molding compound into electrode moldings, adequate mechanical strength and uniform hydrophobic properties of the molding are inadequately met by the methods hereinbefore described.

Accordingly, it is an object of the invention to provide a method which mitigates such disadvantages. In this method, a binder is introduced into the cathode mass in the form of a dispersion in a hydrophilic medium. The binder is preferably an insoluble organic polyer which is non swellable in water, for example polyisobutylene. The polymer as well as the electrode must not swell in water so that the electrode can be manufactured with high accuracy to site and high stability.

The surfaces of the solid particles in the dispersion carry electrostatic charges opposed to the dipole moment of the dispersion medium, which is preferably water. A very uniform distribution of the binder, even when added in very small percentages, may be obtained by a conventional mixing operation, in which a binder in the form of a dispersion of the kind hereinbefore described is introduced into the electrode mass, which is subsequently dried in air. The drying in air is necessary only when a dilute dispersion is used. An extremely uniform distribution of the binder in the cathode mass is, however, obtained. The distribution of the binder is not quite so good (although still adequate) when a concentrated dispersion (20–60%) is mixed with the mass, preferably by spraying; however, in that case an electrode material is obtained which appears to be completely dry.

Portions of "wet" and "dry" mass may readily be mixed to attain the advantages of both the above methods, while avoiding their respective drawbacks to a substantial extent. By varying the concentration of the hydrophobic polymer in the hydrophilic dispersion medium, and by varying the proportion of binder in the electrode mass, electrodes having well-defined properties with respect to electrolyte-absorbing power and mechanical strength can be produced.

It has been found advantageous for the admixed dispersion to contain organic polymer in a concentration of 3%–60%, and preferably in a concentration of 5%–25%.

Very good electrode moldings may be obtained by mixing the dispersion with the manganese dioxide and the graphite for a period of time and in an amount sufficient to produce a mass containing from 0.5% to 5%, preferably from 0.5% to 2%, of polymer and from 1 to 10% moisture or water.

If only for reasons of cheapness, the dispersion of the binder is preferably an aqueous dispersion. A dispersion of (poly) isobutylene has been found to be particularly suitable. Substantially equal results have been obtained by using polystyrene dispersions and dispersion of polyolefins or partially fluorinated polyolefins.

The invention is illustrated in the following example.

EXAMPLE 90 parts by weight of manganese dioxide as depolarizer and 10 parts by weight of graphite as conductive material were mixed to produce a homogeneous mixture. About 1.5 parts by weight of polyisobutylene in the form of a 10% dispersion in water were introduced into the primary mixture, and the total charge was then mixed for a further ten minutes. The mass was then suitable for molding; however, the mass was preferably first dried in air to ensure accurate metering of the mass.

A compression test along the longitudinal and transverse axes is an essential criterion for the physical properties of the cathode moldings.

In a molding 23 mm in diameter, for a primary cell according to IEC Publication 86 Type LR 14, the following ultimate strength values in kilograms up to breaking point were obtained as a function of the admixture and quantity of binder used:

|  | Breaking load-longitudinal axis | |
| --- | --- | --- |
|  | 1% binder | 2% binder |
| (Poly) Isobutylene in (hydrophobic) solvent | 19.5 kg. | 26.0 kg. |
| (Poly) Isobutylene in water | 26.0 kg. | 39.0 kg. |
|  | Breaking load-transverse axis | |
|  | 1% binder | 2% binder |
| (Poly) Isobutylene in (hydrophobic) solvent | 1.5 kg. | 2.0 kg. |
| (Poly) Isobutylene in water | 2.0 kg. | 3.0 kg. |

A further indication was provided by the absorption of electrolyte by the molding as a function of time (in minutes).

In moldings of equal size the variations were as follows:

| | Volume in milliliters of electrolyte absorbed after 10 minutes | | |
| --- | --- | --- | --- |
| Proportion of binder | 1% | 1.5% | 2% |
| (Poly) Isobutylene in (hydrophobic) solvent | 0.55 | — | 0.40 |
| (Poly) Isobutylene in water | 1.65 | 1.50 | 1.30 |

The discharge time is a decisive criterion for the suitability of a cathode mass. Comparing a polyisobutylene binder dissolved in petroleum ether with one in the form of an aqueous dispersion, it was found that, in addition to processing advantages, the discharge times were also better for the dispersion.

|  | Dispersion | Solution |
| --- | --- | --- |
| Type of discharge | | |
| 10 ohm, continuous | 44 hr. | 40 hr. |
| 6 hr. - 50 mA | 102 hr. | 95 hr. |
| 1 hr. - 250 mA | 890 min. | 867 min. |
| 10' - 5 ohm | 1540 min. | 1420 min. |
| 4 hr. - 75 ohm | 390 min. | 360 min. |

We claim:
1. A method of manufacturing a positive electrode body for a primary cell with alkaline electrolyte comprising the steps of
   forming a first mixture of manganese dioxide, and graphite in proportions of active mass and conductive material for the mass, respectively;
   forming a dispersion in water only of polyisobutylene;
   forming a second mixture of the first mixture and the dispersion;
   and molding the second mixture into the positive electrode body.
2. The method of claim 1, in which the second mixture is compressed.
3. The method of claim 2, in which the second mixture is dried before it is compressed.
4. The method of claim 1, in which the dispersion contains from about 3% to 60% by weight of the polyisobutylene.
5. The method of claim 4, in which the dispersion contains from about 5 to 25% by weight of the polyisobutylene.
6. The method of claim 1, in which the dispersion is present in the second mixture in an amount sufficient to produce a mass containing between about 0.5% and 5% by weight of the polyisobutylene and about 1 to 10% by weight of water.
7. The method of claim 6, in which the mass contains from about 0.5% to 2% by weight of the polyisobutylene.
8. A positive electrode body for a primary cell with alkaline electrolyte produced by a method which includes the steps of
   forming a mixture of manganese dioxide, graphite and a dispersion in water only of polyisobutylene;
   and forming the mixture into the electrode body.

* * * * *